US009152214B2

(12) United States Patent
Thumma

(10) Patent No.: US 9,152,214 B2
(45) Date of Patent: Oct. 6, 2015

(54) DYNAMIC LOAD AND PRIORITY BASED CLOCK SCALING FOR NON-VOLATILE STORAGE DEVICES

(71) Applicant: Qualcomm Innovation Center, Inc., San Diego, CA (US)

(72) Inventor: Sujit Reddy Thumma, Hyderabad (IN)

(73) Assignee: Qualcomm Innovation Center, Inc., San Diego, CA (US)

( * ) Notice: Subject to any disclaimer, the term of this patent is extended or adjusted under 35 U.S.C. 154(b) by 275 days.

(21) Appl. No.: 13/895,640

(22) Filed: May 16, 2013

(65) Prior Publication Data

US 2014/0344597 A1 Nov. 20, 2014

(51) Int. Cl.
*G06F 1/32* (2006.01)
*G06F 3/06* (2006.01)

(52) U.S. Cl.
CPC .............. *G06F 1/324* (2013.01); *G06F 1/3221* (2013.01); *G06F 1/3225* (2013.01); *G06F 1/3268* (2013.01); *G06F 1/3275* (2013.01); *G06F 1/3296* (2013.01); *G06F 3/06* (2013.01)

(58) Field of Classification Search
CPC ...................................................... G06F 1/3203
USPC ......................................................... 713/322
See application file for complete search history.

(56) References Cited

U.S. PATENT DOCUMENTS 5,774,704 A * 6/1998 Williams ....................... 713/501
5,949,252 A * 9/1999 Taguchi ........................... 326/86
7,711,966 B2 * 5/2010 Prabhakaran et al. ........ 713/300
8,438,416 B2 * 5/2013 Kocev et al. .................. 713/601
8,468,318 B2 * 6/2013 Colgrove et al. ............. 711/168
8,869,152 B1 * 10/2014 Abrishami et al. ........... 718/102
8,909,961 B2 * 12/2014 Herman et al. ............... 713/322
8,982,375 B2 * 3/2015 Nishikawa ................... 358/1.14
2004/0128575 A1    7/2004 Schmidt
2009/0187779 A1 * 7/2009 Liu et al. ....................... 713/323
2009/0327791 A1 * 12/2009 Aerts ............................ 713/500
2014/0101468 A1 * 4/2014 Narayanan et al. ........... 713/320

OTHER PUBLICATIONS

Yufeng et al, Based on Prospective Dynamic Frequency Scale Power Optimize Method for Multi-Cores Processors I/O System, 2012, Atlantic Press, pp. 3.*
Pillai et al, Dynamic Frequency Scaling Based Energy consumption Reduction for Power-aware Embedded Systems—A Simulation and Experimental Approach, Dec. 6, 2013, JES (Journal of Electrical Systems) pp. 12.*
Wang et al, Dynamic Voltage Scaling for Priority-Driven Scheduled Distributed Real-Time Systems, 2007, University of Kentucky, pp. 116.*
Gu-Yeon Wei, Energy-Efficient I/O Interface Design with Adaptive Power-Supply Regulation, Jun. 2007, Stanford University, pp. 132.*

* cited by examiner

*Primary Examiner* — Suresh Suryawanshi
(74) *Attorney, Agent, or Firm* — Neugeboren O'Dowd PC

(57) ABSTRACT

This disclosure discusses systems, methods, and apparatus for dynamically scaling a clock frequency of an I/O interface to a non-volatile storage device. The scaling can be based on monitoring an idle time on the I/O interface, a priority of one or more applications having read/write requests queued for dispatch to the I/O interface, a load of the queued read/write requests on the I/O interface or a combination of priority and load. Such variables can be compared to thresholds in a frequency governor.

28 Claims, 5 Drawing Sheets

DYNAMIC LOAD AND PRIORITY BASED CLOCK SCALING FOR NON-VOLATILE STORAGE DEVICES

BACKGROUND

1. Field

The present disclosure relates generally to computing device storage, and more specifically to non-volatile storage devices.

2. Background

Dynamic clock-voltage scaling (DCVS) schemes can be used to reduce power consumption by reducing clock frequency and/or voltages. So far, DCVS has typically only been applied to memory and processor subsystems. Yet, storage devices (e.g., peripheral and internal storage drives) and their input-output (I/O) subsystems also have significant impact on device power consumption. Current research has looked at power reduction schemes for disk-based storage—schemes which are not applicable to non-volatile storage devices (e.g., embedded Multi-Media cards (eMMC), Secure Digital (SD), and other Solid-State Devices (SSD)), which are common in embedded systems like handheld devices including smartphones, tablets, and ultrabooks, to name a few. At the same time, clock frequency of these I/O subsystems is on the rise, and with these increased frequencies comes even greater power consumption. There is thus a need in the art to reduce power consumption in I/O subsystems.

SUMMARY

Aspects of this disclosure can be characterized as a non-volatile storage system for scaling an I/O interface frequency between a I/O interface controller device and a non-volatile storage device. The system can comprise a non-volatile storage device; a processor having one or more applications running thereon, each of the one or more applications configured to make read and write requests to the non-volatile storage device; an I/O interface to the non-volatile storage device; a clock control block for the I/O interface generating a clock signal; an I/O interface controller device that sends read/write requests to the non-volatile storage device over the I/O interface at a clock frequency corresponding to the clock signal; an I/O scheduler that: runs on the processor; schedules the read and write requests to an I/O queue of a storage driver, the storage driver configured to dispatch read/write requests from the I/O scheduler to the I/O interface controller; characterizes a predicted load on the I/O interface based on analysis of the read/write requests in the I/O queue as well as on an existing clock frequency of the I/O interface; a frequency governor running on the processor that: performs a comparison of the predicted load to one or more thresholds; and commands the clock control block to decrease the clock signal whenever the predicted load indicates that decreasing the clock signal will not noticeably degrade a user experience.

Other aspects of this disclosure can be characterized as a method for controlling clock frequency of an I/O interface for periodic data flows between a non-volatile storage device and an I/O interface controller. The method can comprise monitoring, via a processor, an idle time of an I/O interface. The method can further comprise comparing, via the processor, the idle time to at least a first and a second threshold. The method can further comprise instructing a clock control block to increase a clock signal corresponding to an I/O clock frequency when the idle time is less than the first threshold. The method can further comprise instructing the clock control block to decrease the clock signal when the idle time is greater than the second threshold. The method can further comprise maintaining the clock signal in an existing state when the idle time is between the first and second thresholds.

Yet further aspects of the disclosure can be characterized as a non-transitory, tangible computer readable storage medium, encoded with processor readable instructions to perform a method for conserving power in an I/O interface for a non-volatile storage device using adaptive frequency scaling. The method can comprise calculating a load on the I/O interface based on analysis of queued read/write requests waiting for dispatch to an I/O interface controller device, the I/O interface coupled between an I/O interface controller device and a non-volatile storage device. The method can comprise scaling a clock frequency of the I/O interface controller device based on the load as follows: setting the clock frequency to a first clock frequency if the predicted load is greater than a first threshold; setting the clock frequency to a third clock frequency if the predicted load is less than a second threshold; and setting the clock frequency to a second clock frequency if the predicted load is between the first and second thresholds, the first clock frequency is greater than the second clock frequency and the second clock frequency is greater than the third clock frequency.

Still further aspects of the disclosure can be characterized as a system comprising: a means for monitoring an idle time of an I/O interface; a means for comparing the idle time to at least a first and a second threshold; a means for instructing a clock control block to increase a clock signal corresponding to an I/O clock frequency when the idle time is less than the first threshold; a means for instructing a clock control block to decrease the clock signal when the idle time is greater than the second threshold; and a means for maintaining the clock signal in an existing state when the idle time is between the first and second thresholds.

BRIEF DESCRIPTION OF THE DRAWINGS

FIG. 4 illustrates a method where the existing clock frequency determines which threshold(s) the load is compared to.

DETAILED DESCRIPTION

The word "exemplary" is used herein to mean "serving as an example, instance, or illustration." Any embodiment described herein as "exemplary" is not necessarily to be construed as preferred or advantageous over other embodiments.

For the purposes of this disclosure, I/O subsystems can support peripheral storage devices as well as internal storage devices. Peripheral storage devices can include memory devices connected to a computing device via USB, LIGHTNINGBOLT, or other interfaces. For instance a memory stick or portable external hard drive are two examples. Internal storage devices can include hard drive discs (HDD) and solid state hard drives (SDD).

For the purposes of this disclosure, an I/O clock frequency refers to a clock frequency on an I/O interface or a clock frequency within an HDD (e.g., a frequency of platter rotation or a frequency of read/write accesses to the platters).

Power consumption in a storage I/O subsystem is proportional to I/O clock frequency. Thus, reducing I/O clock frequency can conserve power. However, reducing I/O clock frequency reduces the user experience unless intelligent methods are used to determine when the clock frequency is to be adjusted (increase or decreased) and thus preserve a perceived user experience. In this disclosure, clock frequency is dynamically adjusted based on application/process behavior and data read/write patterns to storage devices. In particular, scaling of the I/O interface (bus) clock frequency is based on an idle time of the I/O interface for periodic dataflows to and from a non-volatile storage device, and is based on a priority and/or a load (or predicted load) of requests in a read/write request queue waiting for dispatch to the lower level drivers of the I/O interface. A non-volatile storage device can include an SDD or HDD, to name two examples. The priority and/or load based systems, methods, and apparatus consider an overhead involved in switching the clock frequency of the I/O interface, and the energy and access times of the underlying hardware such that power is conserved while not degrading user experience.

Figure 1:
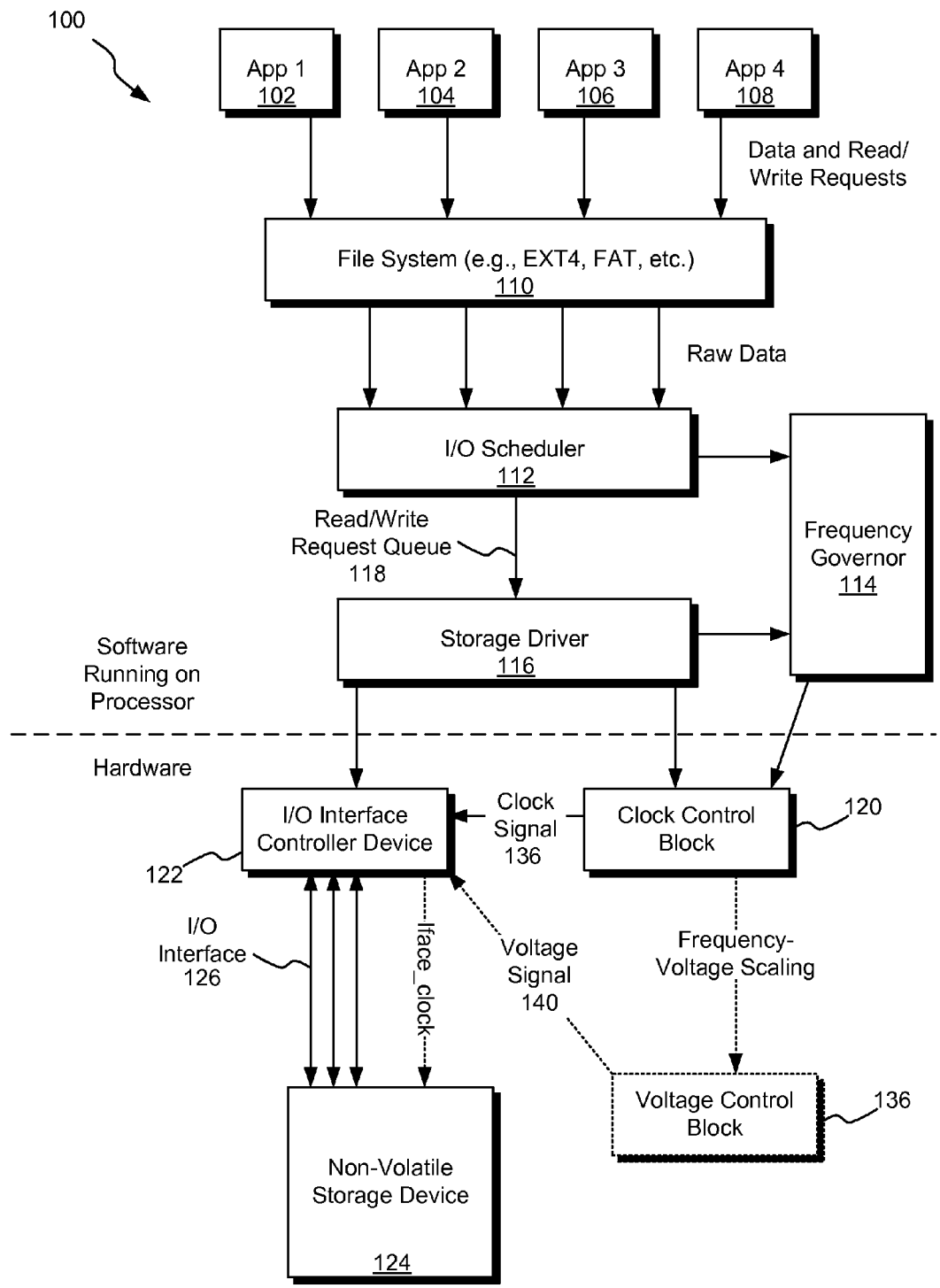
FIG. 1 illustrates a computing device including an input-output (I/O) system for reading and writing to a non-volatile storage device.
Figure 2:
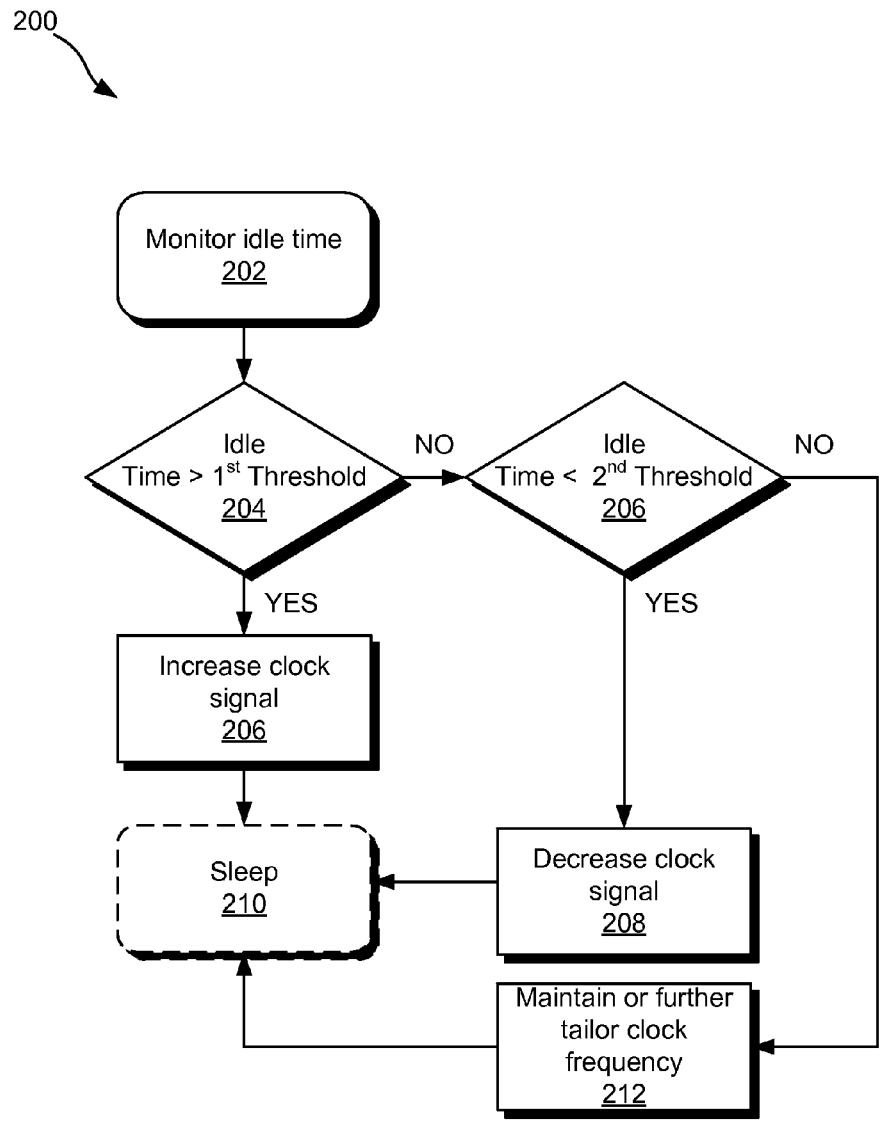
FIG. 2 illustrates a method for scaling a I/O interface clock frequency for a non-volatile storage device given periodic dataflows on the I/O interface.

Dataflows to and from storage devices can either be periodic or non-periodic. Periodic dataflows include background or batched application requests that a user typically is not privy to (e.g., requests associated with maintaining a wireless network connection). Non-periodic dataflows include application requests that users typically are aware of (e.g., a user clicking on a photograph in order to view it in greater detail). FIG. 1 will discuss embodiments where storage access is periodic or non-periodic. FIG. 2 will discuss embodiments particularly applicable to situations where storage access is periodic, while FIG. 3 will discuss embodiments particularly applicable to situations where storage device access is non-periodic. Periodic dataflows are read in a sequential manner with deterministic delays between each access to the I/O interface. Examples include video and audio playback, USB mass storage file transfer, benchmark applications, video recording, and video preview. Non-periodic dataflows may require a minimum latency in accessing data from the I/O device.

FIG. 1 illustrates a computing device including an input-output (I/O) system for reading and writing to a non-volatile storage device. The system 100 illustrates both software and hardware and aspects of software-hardware interaction that enable I/O interface clock scaling in order to reduce energy consumption while not degrading a perceived user experience. System 100 operates by scaling I/O interface clock frequency based on an idle time of the I/O interface 128, priority assigned to applications making read/write requests to the non-volatile storage device 124, a load on the I/O interface 122 as calculated by an I/O scheduler 112, or a combination of priority and load. Whether idle time, priority, load, or priority and load are used, a frequency governor 114 take the idle time, priority, load, or priority and load, and determines a frequency to set the I/O interface to. In some cases, the frequency governor 114 can have knowledge of clock frequencies that the hardware is able to operate at and can select a clock frequency from such available frequencies.

A more detailed description of the system 100 is as follows. One or more applications (or apps) 102, 104, 106, 108 can make read/write requests to a file system 110. These requests can include data. The file system 110 can be EXT4 or FAT to name two non-limiting examples. The file system 110 can convert the data to a raw format for storage on the non-volatile storage device 124. The file system 110 can queue the read/write requests and their payloads into an I/O scheduler 112 such as the LINUX Completely Fair Queuing (CFQ) Scheduler. The I/O scheduler 112 can queue the read/write requests for dispatch to a storage driver 116 in a read/write request queue 118. The order of the queue can be determined via scheduling algorithms well known to those of skill in the art. Dispatch to the storage driver 116 can include requesting that the storage driver 116 send or retrieve data from hardware. The storage driver 116 can program a clock control block 120 to generate one or more clock signals 136. The storage driver 116 can also program an I/O interface controller device 122 to interface with the non-volatile storage device 124 through an I/O interface 126. The I/O interface controller device 122 can use the one or more clock signals 136 to manage the sending and receiving of data to and from the non-volatile storage device. In other words, the I/O interface clock frequency is governed by the I/O interface controller device 122, which bases the I/O interface clock frequency on the clock signal 136.

In order to scale the clock frequency, idle time may be used. The storage driver 116 can monitor an idle time of the I/O interface 126 and provide the idle time to the frequency governor 114. The frequency governor 114 can determine a clock frequency to set the I/O interface to based on the idle time. For instance, the frequency governor 114 can compare the idle time to one or more thresholds (see e.g., FIG. 2). Depending on the outcome of this comparison, the clock frequency can be increased, decreased, or maintained. The frequency governor 114 can program the clock control block 120 to generate a clock signal 136 that will result in a desired I/O interface clock frequency. The use of idle time is particularly useful when periodic data flows traverse the I/O interface 126.

For non-periodic data flows across the I/O interface, as well as an alternative system for scaling when data flows are periodic, a priority assigned to requesting applications can be implemented. In this embodiment, the I/O scheduler 112 is aware of a priority assigned to each application 102, 104, 106, 108 making requests to read/write data from/to the non-volatile storage device 124 and can provide this priority data to the frequency governor 114. The frequency governor 114 can compare the priorities to a set of rules and determine whether and how to adjust the clock frequency accordingly. Details of the priority-based clock scaling will be discussed in further detail relative to FIG. 3.

Load can also be considered for clock scaling given non-periodic or periodic data flows. The I/O scheduler 112 can determine a load on the I/O interface based on an analysis of read/write requests in the read/write request queue 118 and can pass this load data to the frequency governor 114. The frequency governor 114 can use the load to determine whether and how to scale the I/O interface clock frequency. In some embodiments, the frequency governor 114 can compare the load to one or more thresholds and instruct the clock control block 120 based on this comparison (or comparisons).

In yet another embodiment, the I/O scheduler 112 can pass priority and load information to the frequency governor 114, which can then use the priority and load information to determine whether and how to scale the clock frequency.

In one embodiment, the one or more clock signals 136 can include a clock signal used by the I/O interface controller device 122 and a clock signal passed to the non-volatile storage device 124 as iface_clock. In other embodiments, the I/O interface controller device 122 can use two or more clocks for its own use.

Optionally, the I/O interface controller device 122 can pass one or more of the clock signals 136 to the non-volatile storage device 124 as iface_clock. The non-volatile storage device 124 can use iface_clock for phase alignment or other purposes.

Optionally, a voltage control block 136 can control a voltage level on the I/O interface via a voltage signal 140.

The software, components illustrated above the horizontal dotted line, can operate on a processor. The specific processor used is not essential to this disclosure and any suitable general-purpose processor such as an Intel, AMD, or ASIC dedicated to perform the operations described herein, or a field application gate array (FPGA), can be used. The processor can represent one or more processors. In one or more embodiments, the processor can be implemented as a central processing unit (CPU). The processor 110 can be implemented as a "hard" processor (e.g., dedicated circuitry), or as a "soft" processor (e.g., implemented using the programmable fabric of a programmable IC).

The non-volatile storage device 124 can represent one or more non-volatile storage devices and can be implemented as a NAND flash device, a serial peripheral interface (SPI) flash device, a queued peripheral interface (QSPI) flash device, a serial advanced technology attachment (SATA) flash device, or any other non-volatile storage device.

The I/O interface controller device 122 facilitates communication between the processor and the non-volatile storage device 124. The I/O interface controller device 122 can be implemented within the programmable fabric of a programmable integrated circuit (IC). It should be appreciated, however, that the I/O interface controller device 122 can be implemented or instantiated within an IC that is programmable or an IC that is not programmable. Further, the processor can be implemented on the same IC within which the I/O interface controller device 122 is implemented or within an IC that is different from the IC within which the I/O interface controller device 122 is implemented.

The I/O interface controller device 122 can communicate with the processor via a bus such as a system bus (not illustrated). The I/O interface 126 can include any electrical path for carrying data between the non-volatile storage device 124 and the I/O interface controller device 122. In one or more other embodiments, the processor can be coupled to I/O interface controller device 122 via one or more direct signal links, for example. The particular type of connection between the processor and the I/O interface controller device 122 is not intended as a limitation of the one or more embodiments disclosed within this specification.

In an embodiment, some portions of the processor and the I/O interface controller device 122 can operate at different clock frequencies. In other words, the I/O interface controller device 122 and the processor may have different clocks.

Where the non-volatile storage device 124 is a HDD, the storage driver 116 can provide a "hint" to a clock control block of the HDD regarding a desired clock frequency. The clock control block of the HDD can use the hint to scale or maintain an internal clock frequency of the HDD (e.g., a platter rotation frequency). The clock control block of the HDD can be part of a processor of the HDD.

FIG. 2 illustrates a method for scaling an I/O interface clock frequency for a non-volatile storage device given periodic dataflows on the I/O interface. The method 200 begins with a monitoring operation 202 that monitors an idle time of an I/O interface (e.g., by monitoring an idle time of an I/O interface controller device such as 122 in FIG. 1). The I/O interface is idle when data is not traversing the I/O interface. Such idle time can be monitored (e.g., measured, calculated, or estimated) for a fixed sampling window (period of time). The idle time in each window, or an average idle time per window, can be compared to a first threshold and a second threshold in an idle time greater than first threshold decision 204 and an idle time less than second threshold decision 206. If the idle time (or average idle time) is greater than the first threshold, then the I/O interface clock frequency ("clock frequency") can be increased by instructing a clock control block (e.g., clock control block 120 in FIG. 1) to increase a clock signal corresponding to the clock frequency. This can take place in an increase clock signal operation 206. If the idle time (or average idle time) is less than the second threshold, then the clock frequency can be decreased by instructing a clock control block to decrease the clock signal corresponding to the clock frequency. This can take place in a decrease clock signal operation 208. If the idle time or average idle time is between the first and second thresholds, then the clock frequency can be left alone or maintained (or further tailored) at an existing (current or prior) clock frequency in a maintain or further tailor clock frequency operation 212. This can involve instructing the clock control block to continue generating the same clock signal or may involve not sending any control message to the clock control block so that the clock control block can continue generating an existing clock signal. However the clock frequency is scaled, or even if it is maintained at the existing clock frequency, the method 200 can then optionally sleep in sleep operation 210 until a period of time has elapsed, at which time the monitor idle time operation 202 begins again. In some embodiments, the optional sleep operation 210 can be excluded, and the method 200 can repeat the monitor idle time operation 202 during or after the clock frequency is adjusted (or maintained).

When the clock frequency is increased it can be increased to a maximum clock frequency that the I/O interface can operate at, or some value in between an existing I/O clock frequency and the maximum clock frequency. When the clock frequency is decreased it can be decreased to a minimum clock frequency that the I/O interface can operate at, or some value in between an existing clock frequency and the minimum clock frequency. Alternatively, the clock frequency can be increased to a first predetermined frequency, decreased to a predetermined third frequency, or maintained at a predetermined second frequency. In some embodiments, more than two thresholds can be used and accordingly, one of skill in the art will recognize that more than three predetermined frequencies can be used. Predetermined clock frequencies can include those that are part of a clock frequency plan or clock frequencies supported by hardware.

The "window time" period can be selected based on empirical data. "Periodic data flows" are those in which an average idle time in each window is constant or substantially constant. "Non-periodic data flows" are those in which an average idle time in each window is not constant.

In FIG. 2 a storage driver can typically determine an idle time of the I/O interface since the storage driver instructs the I/O interface controller device to send/receive data on the I/O interface. The storage driver can provide the idle time to a frequency governor, which can use the idle time to determine whether and how to adjust a clock frequency of the I/O interface. For instance, the idle time can be compared to one or more thresholds. The frequency governor can then instruct a clock control block to generate a clock signal which the I/O interface controller device can use to effectuate an I/O interface clock frequency.

Figure 3:
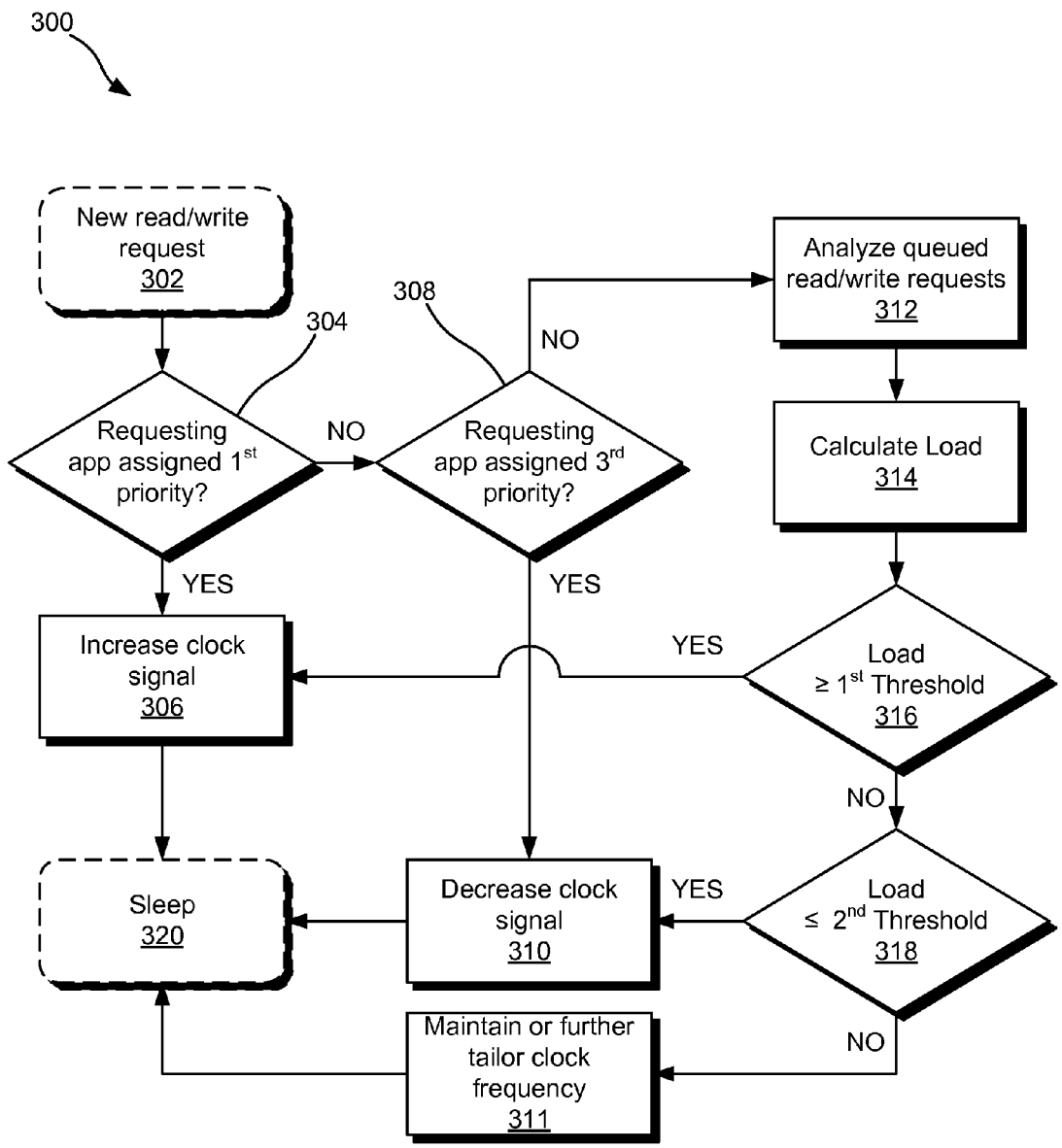
FIG. 3 illustrates a method for scaling an I/O interface clock frequency of an I/O interface between an I/O controller and a non-volatile storage device.

FIG. 3 illustrates a method for scaling an I/O interface clock frequency of an I/O interface between an I/O controller and a non-volatile storage device. Here, the clock frequency scaling can be based on a priority and/or load (or predicted load) of read/write requests in a queue of the I/O interface, and is therefore particularly applicable to non-periodic data flows between non-volatile storage and an I/O interface controller as well as periodic data flows. Where the scaling is priority based, the application making a read/write request (e.g. having a first read/write request in the queue) may be assigned a first, second, or third priority corresponding to an importance of dispatching the application's read/write requests from a read/write request queue (e.g., read/write request queue 118) to the I/O interface controller device. Where the scaling is load based, a load calculation and comparison to at least a first and second threshold can be used to determine whether to increase, decrease, or maintain (or further tailor) the existing clock frequency (comparison to three or more thresholds can also be implemented). Where both a priority and load based method are implemented, the load-based method can be a subroutine used when the application making one or more read/write requests is assigned the second priority.

When the requesting application is assigned the first priority, the clock frequency is increased. Optionally, the clock frequency can be increased or set to a first clock frequency (e.g., 200 MHz) or optionally increased to a maximum clock frequency of the I/O interface. The first priority is assigned to an application requiring that its one or more read/write requests see immediate dispatch to the I/O interface controller device. The first priority can also be assigned to an application that blocks the I/O interface from transporting further requests (whether generated by the blocking/requesting application or another application).

When the requesting application is assigned the third priority, the clock frequency is decreased. Optionally, the clock frequency can be decreased or set to a third clock frequency (e.g., 50 MHz) or optionally decreased to a minimum clock frequency of the I/O interface. The third priority is assigned to an application when its read/write requests do not require immediate dispatch and there are no finite deadlines for dispatch of the application's read/write requests to the I/O interface. In other words, when an application's read/write requests have no necessity to be dispatched (i.e., only read/write requests that are dispatched when time permits), then the application is assigned the third priority.

When the requesting application is assigned the second priority, then scaling of the clock frequency can be more complicated. For instance, the clock frequency may be maintained at an existing clock frequency, or may be further tailored (e.g., increased or decreased) depending on a number of factors, such as a load (or predicted load) on the I/O interface. By analyzing read/write requests in the I/O queue, a predicted of load on the I/O interface can be made. The second priority is assigned to a requesting application when the application does not have any read/write requests that require immediate dispatch to the I/O interface controller device, yet has at least one read/write request with a finite deadline for dispatch. This is the most common state to be assigned to an application. In some cases, when the I/O scheduler is faced with an application having the second priority, the I/O scheduler may turn to a load-based algorithm as a sub-routine of the priority-based algorithm discussed so far.

The method 300 illustrates an embodiment where both the priority-based and load-based methods are used in combination, and thus the load-based method is a subroutine used when the requesting application is assigned the second priority. The method 300 can determine whether to scale the clock frequency every time a new read/write request is made or added to the queue, and thus can start with an optional new read/write request added to queue operation 302. Alternatively, the method 300 can periodically begin to perform and thus periodically start with the I/O interface controller facing a first decision 304. If the first decision 304 determines that the requesting application is assigned the first priority (e.g., the RT state of the LINUX CFQ Scheduler), then the method 300 can increase the clock frequency via an increase clock signal operation 306. The increase in clock frequency can include setting a clock signal to a first clock frequency (e.g., 200 MHz) in one embodiment, or to a maximum clock frequency in another embodiment. The method 300 can then optionally go to sleep (sleep operation 320) and/or return to either the new read/write request operation 302 or the first decision 304.

If the application is not assigned the first priority, then the method 300 determines if the requesting application is assigned the third priority (e.g., the IDLE state of the LINUX CFQ Scheduler) in decision 308. If the requesting application is assigned the third priority, then the clock frequency can be decreased via the decrease clock signal operation 310. The decrease in clock frequency can include setting the clock signal to a third clock frequency (e.g., 50 Mhz) in one embodiment, or to a minimum clock frequency in another embodiment. The method 300 can then optionally go to sleep and/or return to either the new read/write request option 302 or the first decision 304.

If the application is not assigned the third priority, then the method 300 turns to the load-based subroutine starting with an analysis of the queued read/write requests in an analyze queued read/write requests operation 312. Based on the read/write requests in the queue and optionally other factors such as inherent latency of the storage hardware, a calculate load operation 314 calculates a load or load value that characterizes a load (or predicted load) on the I/O interface and can then be compared to thresholds in order to determine how or if to scale the clock frequency (e.g., be adjusting a clock signal from the clock control block). In particular, the load can be compared to a first threshold in decision 316, and if the load is greater than or equal to the first threshold, then the clock frequency can be increased. Alternatively, if the load is less than or equal to a second threshold, then the clock frequency can be decreased. If the load is in between the first and second thresholds, then the clock frequency can be tailored to the load, which may include maintaining the clock frequency at an existing clock frequency. Tailoring may also include scaling the clock frequency as a function of the load, but may entail smaller adjustments to the clock frequency than occur when the load is greater than or equal to the first and second thresholds.

Adjustments to the clock frequency and signal have sometimes been used interchangeably in this disclosure. One of skill in the art will recognize that the clock frequency is related to and dependent on the clock signal and thus a change in one corresponds with a similar change in the other. Hence, the two terms can, but are not required, to be used interchangeably.

While only a first and second threshold are illustrated, along with only an increase, decrease, or maintenance of the clock frequency, one of skill in the art will recognize that more than two thresholds can be used, and more than three actions taken in response to comparison of the load to those three or more thresholds, may be implemented.

In some cases rather than merely increasing or decreasing the clock frequency, the clock frequency may be set to a first, second, third, and so on, predetermined frequencies. In another embodiment, the existing clock frequency may influence what the one or more thresholds are that the load is compared to.

Figure 4:
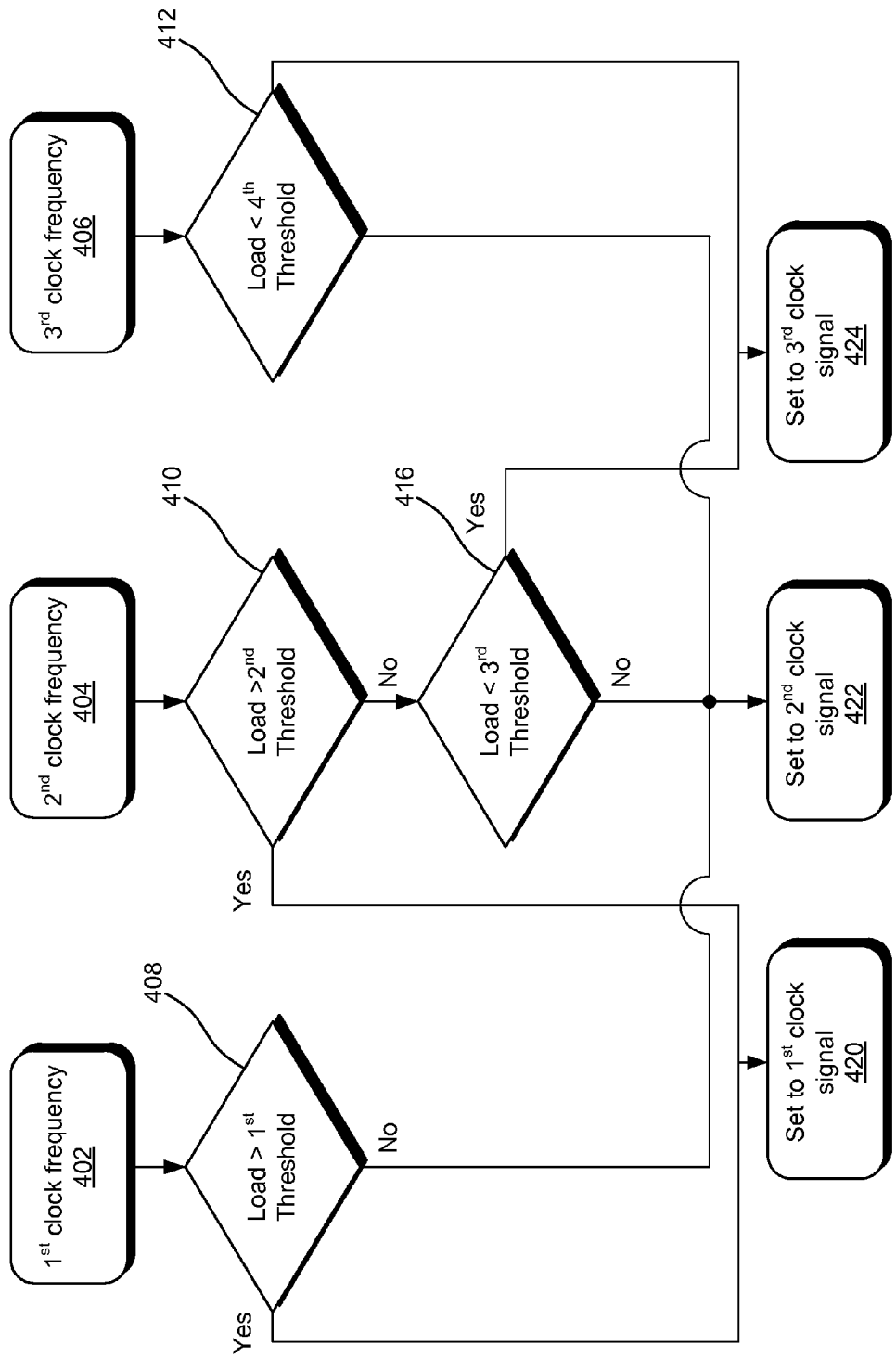

For instance, FIG. 4 illustrates a method 400 where the existing clock frequency determines which threshold(s) the load is compared to. If the existing clock frequency is a first predetermine clock frequency (block 402) and the load is greater than the first threshold (decision 408), then the clock frequency can be set to (maintained at) the first predetermined clock frequency (block 420). If the load is less than the first threshold, then the clock frequency can be set to the second predetermined clock frequency (block 422).

If the existing clock frequency is a second predetermined clock frequency (block 404) and the load is greater than a second threshold (decision 410), then the clock frequency can be set to the first predetermined clock frequency (block 420). If the load is less than the second threshold (decision 410) and less than a third threshold (decision 416), then the clock frequency can be set to the third predetermined clock frequency (block 424). If the load is between the second and third thresholds (decisions 410 and 416), then the clock frequency can be set to (maintained at) the second predetermined clock frequency (block 422).

If the existing clock frequency is a third predetermined clock frequency (block 406) and the load is less than a fourth threshold (decision 412), the clock frequency can be set to (maintained at) the third predefined clock frequency (block 424). If the load is greater than the fourth threshold (decision 412), then the clock frequency can be set to the second predetermined clock frequency (block 422).

One of skill in the art can easily extend this pattern and the flowchart of FIG. 4 to embodiments having five or more thresholds and four or more predetermined clock frequencies.

A highest frequency can be referred to as a maximum frequency, while a lowest frequency can be referred to as a minimum frequency. In one non-limiting embodiment, the first predetermined frequency can be 200 MHz, the second predetermined frequency can be 150 MHz, and the third predetermined frequency can be 100 MHz. Other values for the predetermined frequencies can easily be selected by one of skill in the art without departing from the spirit of this disclosure.

In some embodiments, the methods 300 and 400 can be implemented via the Complete Fair Queuing (CFQ) scheduler of LINUX. In such embodiments, the three priorities assigned to the requesting applications can be the Real Time (RT), Best Effort (BE), and IDLE priority states.

Discussion now turns to determining how to scale the clock frequency when the requesting application is assigned the second priority; in other words, how to calculate the load as performed in the calculate load operation 314.

In one embodiment, the load can be a function of priority indicators. For instance, given the LINUX CFQ scheduler, the Best Effort (BE) class includes eight subcategories, 1-8, where 1 is assigned to read/write requests having the highest priority. These eight subcategories can be priority indicators used to calculate the load. In one embodiment, the clock frequency can be increased when the subcategory is 1-4, and the clock frequency can be decreased when the subcategory is 5-8. Alternatively, the I/O interface controller can be biased toward increasing the clock frequency when the subcategory is 1-4 and can be biased toward decreasing the clock frequency when the subcategory is 5-8. In an embodiment, the clock frequency can be set to a next highest clock frequency when the subcategory is 1-4 and can be set to a next lowest clock frequency when the subcategory is 5-8.

In one embodiment, the load can be a function of a number of read/write requests in the queue. In another embodiment, the load can be a function of a number of read/write requests in the queue times the size of each read/write request. This calculation can be represented as follows:

$$\sum_{i=0}^{n_r} S_i \qquad \text{(Equation 1)}$$

where $n_r$ is the number of read/write requests in the queue, and $S_i$ is the size of each read/write request. In an embodiment, the size of each read/write request can be expressed in bytes, although any unit of size for electronic data can be used. The load can be equal to the result of Equation 1, or the result of Equation 1 can be combined with (e.g., added or multiplied with) other values to arrive at the load. Some other possible values that can be used alone or in combination with Equation 1 to calculate the load are discussed below.

In another embodiment, Equation 1 can be modified to apply a weight to each read/write request giving greater weight to those read/write requests having greater urgency or priority for dispatch to the I/O interface. Equation 2 shows modification of Equation 1 to account of such weights, where a, represents the weight assigned to each read/write request.

$$\sum_{i=0}^{n_r} \alpha_i S_i \qquad \text{(Equation 2)}$$

In one embodiment, $\alpha_i$ can be referred to as a weight factor, and can be related to the BE class subcategories (e.g., 1-8) given the LINUX CFQ Scheduler. For instance, a, could be equal to the inverse of the BE class subcategory for each read/write request. Alternatively, $\alpha_i$ could be equal to the BE class subcategory divided by 4 as follows:

$$\sum_{i=0}^{n_r} \frac{prior_i}{4} S_i \qquad \text{(Equation 3)}$$

where the variable, $prior_i$, is the BE class subcategory.

In some embodiments, some read/write requests in the queue may be periodic while others are non-periodic—hence the method 300 applies to both periodic and non-periodic data flows. Periodic read/write requests may be easier to handle at lower clock frequencies while non-periodic read/write requests may be better handled by higher clock frequencies. Thus, calculating the load can be a function of the ratio of periodic to non-periodic read/write requests in the queue. For instance, where a majority of read/write requests in the queue are periodic, the clock frequency can be decreased. Or, where a majority of read/write requests in the queue are non-periodic, the clock frequency can be increased.

In another embodiment, the load can be a function of I/O interface controller throttling. That is, a value can be assigned to a frequency or severity of instances when the I/O interface controller throttles dispatch of queued read/write requests to the device layer and this value can be used to calculate the load. Thus the occurrence of throttling or a quantitative description of throttling (e.g., frequency and/or severity) can influence the load. For instance, when throttling is occurring it may be desirable to increase the clock frequency. In an embodiment, the amount of throttling can be represented as follows:

$$1 + \frac{n_{r\_disp}}{quantum} \qquad \text{(Equation 4)}$$

where $n_{r\_disp}$ is a number of read/write requests already dispatched to the I/O interface driver(s), and the variable, quantum, is a threshold number of read/write requests dispatched to the I/O interface driver(s) above which throttling occurs.

In an embodiment, the load can be a function of access latency for the non-volatile storage device. I/O interface controller can extract the access latency from the non-volatile storage device as this value is embedded in most non-volatile storage devices during manufacturing. When the non-volatile storage device is detected in the hardware during system bootup or during hotplug (plugging the device into a computing device while the computing device is running), the I/O interface controller can read out the access latency via the I/O interface. In some cases the access latency can be information stored in hardware registers of the non-volatile storage device.

The access latency can be a function of a read/write access time and a bus access time. Write access time can be a function of a read access time multiplied by an rw_factor, where the read access time and the rw_factor can be read out from the non-volatile storage device (e.g., from hardware registers of the non-volatile storage device). The bus access time depends on the clock frequency, such that higher clock frequencies lead to lower bus access times. Bus access time can include intrinsic delays, but in many cases these are small enough to be neglected.

Access latency can be quantitatively presented as Equation 5 below, which shows a total time to process a set of block I/O requests.

$$t_{block} = (\text{read\_access\_time} + \text{bus\_access\_time}) * n_{blocks} \quad \text{(Equation 5)}$$

where the variable, $n_{blocks}$, is a number of I/O blocks in the set of I/O blocks. Equation 5 is written for read requests. For write requests, $t_{block}$ can be written as follows:

$$t_{block} = (\text{write\_access\_time} + \text{bus\_access\_time}) * n_{blocks} \quad \text{(Equation 6)}$$

In an embodiment, the load can also be a function of a likelihood of I/O preemption events. Preemption events occur when a read/write request is unable to complete during an allocated I/O access period, and the read/write request is forced to wait for one or more other read/write requests to access the I/O interface before the read/write request can resume its access. Preemption is often implemented so that all read/write requests have 'fair' access to the I/O interface (e.g., so that large read/write requests do not monopolize the I/O interface). Because of this, in some cases, a read/write request can be preempted multiple times. Large numbers of preemption events can seriously degrade the user experience, and thus when the I/O interface controller sees greater numbers of preemption events it is more likely to increase the clock frequency. In other words, variables influencing the load calculation may lead to a higher load value as the number of preemption events increases. In one embodiment, the influence of preemption events on the load can be quantitatively represented as follows:

$$\text{access\_period}_{weight\_factor} = \frac{\sum_{i=0}^{n_r} \left( t_{block_{i_{low}}} - t_{block_{i_{high}}} \right)}{x_{access\_period}} \quad \text{(Equation 6)}$$

where the variable, $\text{access\_period}_{weight\_factor}$, represents a weight factor on the load of preemption and is equal to a sum divided by an empirical value, $x_{access\_period}$, that is selected based on experimental results. For instance, based on experimentation on use cases such as video, browser, and storage benchmark tests, the value 2 has been empirically shown to be one acceptable value for the $x_{access\_period}$. The variable, $n_r$, is a number of read/write requests. The variable, $t_{block\_i\_low}$, is calculated using either Equation 5 or Equation 6 given a low, or existing, clock frequency, and is an estimated time to process all of the pending read/write requests in a process. The variable, $t_{block\_i\_high}$, is calculated using either Equation 5 or Equation 6 given a high clock frequency, and is an estimated time to process all of the pending read/write requests in a process. The variable, $\text{access}_{period}$, is the access period or time allocated (e.g., by the I/O scheduler) to each read/write request for accessing the I/O interface. In cases where the LINUX CFQ Scheduler is implemented, $x_{access\_period}$, can be a "slice time." Slice time can depend on an I/O priority of the application requesting the read/write request.

It should be noted that deadlines and access periods are not synonymous. A deadline may be associated with each requesting application, while one or more access periods may be associated with the one or more read/write requests made by the requesting application. Typically time elapsed to a deadline is longer than an access period. When a requesting application has not completed its one or more read/write requests by a deadline (e.g., the requesting application misses its deadline), its one or more read/write requests can be given the highest priority and can then be dispatched to the I/O interface driver(s) immediately. As the number of requesting applications missing deadlines increases, there is greater incentive to increase the clock frequency. Thus, in an embodiment, load can be a function of missed deadlines, which, in an embodiment, can be quantitatively represented as follows:

$$\text{deadline}_{weight\_factor} = \frac{\sum_{i=0}^{n_r} \left( t_{block_{i_{low}}} - t_{block_{i_{high}}} \right)}{x_{deadline}} \quad \text{(Equation 7)}$$

where Equation 7 is a modification of Equation 6 in that the variable, $\text{deadline}_{time}$, is a time elapsed to the deadline, and the variable, $x_{deadline}$, is determined empirically like the variable, $x_{access\_period}$, was.

The load can be based on one or more of equations 1-7, although equations 1-3 and 5-6 are variations on each other and thus only one of equations 1-3 and only one of equations 5-6 would likely be used in calculating the load. For instance, the load could equal a sum or product of the values derived from any one or more of equations 1-7. As one non-limiting example, the load could equal:

Load=Equation 1*Equation 7 or

Load=Equation 3*Equation 4*Equation 5*Equation 7

Each of the equations when used together to calculate the load can be considered a weight of each factor influencing the load. To provide a more detailed example, all of the aforementioned factors can be combined to determine the load, for instance, as follows:

$$\text{Load} = \left( \sum_{i=0}^{n_r} \alpha_i S_i \right) \times \left( 1 + \frac{n_{r\_disp}}{\text{quantum}} \right) \times \quad \text{(Equation 8)}$$

-continued $$\left( \frac{\sum_{i=0}^{n_r}\left(t_{block_{i_{low}}} - t_{block_{i_{high}}}\right)}{\frac{access_{period}}{x_{access\_period}}} \right) \times$$

$$\left( \frac{\sum_{i=0}^{n_r}\left(t_{block_{i_{low}}} - t_{block_{i_{high}}}\right)}{\frac{deadline_{time}}{x_{deadline}}} \right)$$

Equation 8 includes Equations 2, 4, 6, and 7 although other variations for calculating the load are also possible. For instance, in some cases an equation similar to equation 8 can be calculated for Sync requests and for Async requests, and the values derived from both equations can be summed to determine the load. Sync requests are mainly the read requests on which the application waits for data to be read out from the storage device in order to decode it and use it or the write sync requests like file system flushes that makes sure the data is present in the storage media before exiting (example during system shutdown process). Another such write sync example is when the volatile RAM memory is fully consumed and in order to free up some pages in the RAM memory the dirty pages needs to be swapped out to the storage media before allocating any new buffers. In Async requests there could be no application blocked but just that the writes are queued to be written to the storage media (example includes camcorder recording, USB mass storage or WIFI file downloads etc). Since, these two types of requests have different effect on the application interactive behavior we calculate load on these requests separately and then combine with appropriate weights to calculate the total load. This concludes the discussion of the calculate load operation 314.

In order to predict a priority or load on the I/O interface, read/write requests are analyzed before being dispatched from the read/write request queue to the I/O interface controller device. An I/O scheduler is one module that can be used to analyze the read/write requests before dispatch. This is because an I/O scheduler is configured to dispatch read/write requests from an application to an underlying driver or drivers.

In FIGS. 3 and 4, an I/O scheduler typically calculates or determines the load and then passes this information to a frequency governor. The frequency governor can use the load to determine whether and how to adjust the clock frequency. In some instances, the frequency governor can compare the load to one or more thresholds as discussed above. The frequency governor can then instruct a clock control block to generate a clock signal corresponding to a desired clock frequency. An I/O interface controller device can then use the clock signal to control a clock frequency of the I/O interface.

This disclosure has referred to applications making read/write requests to the I/O interface in order to access the non-volatile storage device. Such applications can also take the form of apps, processes, services, or programs.

Figure 5:
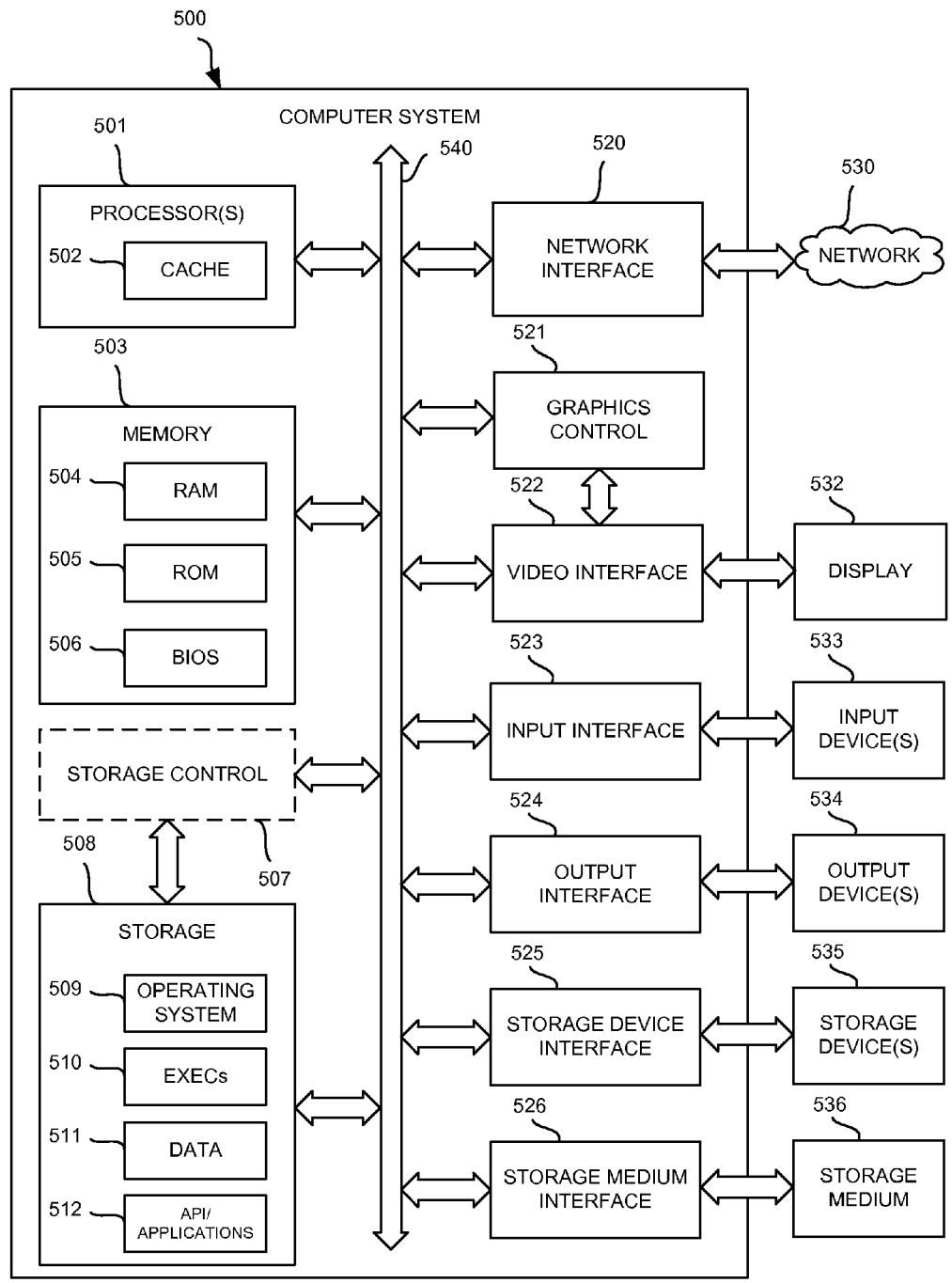
FIG. 5 shows a diagrammatic representation of one embodiment of a computer system.

The systems and methods described herein can be implemented in a computer system in addition to the specific physical devices described herein. FIG. 5 shows a diagrammatic representation of one embodiment of a computer system 500 within which a set of instructions can execute for causing a device to perform or execute any one or more of the aspects and/or methodologies of the present disclosure. The system 100 in FIG. 1 is one implementation of the computer system 500. The components in FIG. 5 are examples only and do not limit the scope of use or functionality of any hardware, software, firmware, embedded logic component, or a combination of two or more such components implementing particular embodiments of this disclosure. Some or all of the illustrated components can be part of the computer system 500. For instance, the computer system 500 can be a general purpose computer (e.g., a laptop computer) or an embedded logic device (e.g., an FPGA), to name just two non-limiting examples.

Computer system 500 includes at least a processor 501 such as a central processing unit (CPU) or an FPGA to name two non-limiting examples. The computer system 500 may also comprise a memory 503 and a storage 508, both communicating with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various non-transitory, tangible computer-readable storage media 536 with each other and with one or more of the processor 501, the memory 503, and the storage 508. All of these elements may interface directly or via one or more interfaces or adaptors to the bus 540. For instance, the various non-transitory, tangible computer-readable storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 501 (or central processing unit(s) (CPU(s))) optionally contains a cache memory unit 502 for temporary local storage of instructions, data, or computer addresses. Processor(s) 501 are configured to assist in execution of computer-readable instructions stored on at least one non-transitory, tangible computer-readable storage medium. Computer system 500 may provide functionality as a result of the processor(s) 501 executing software embodied in one or more non-transitory, tangible computer-readable storage media, such as memory 503, storage 508, storage devices 535, and/or storage medium 536 (e.g., read only memory (ROM)). For instance, the methods 200, 300, and 400 in FIGS. 2, 3, and 4 may be embodied in one or more non-transitory, tangible computer-readable storage media. The non-transitory, tangible computer-readable storage media may store software that implements particular embodiments, such as the methods 200, 300, and 400, and processor(s) 501 may execute the software. Memory 503 may read the software from one or more other non-transitory, tangible computer-readable storage media (such as mass storage device(s) 535, 536) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software. In some embodiments, an FPGA can store instructions for carrying out functionality as described in this disclosure (e.g., the methods 200, 300, and 400). In other embodiments, firmware includes instructions for carrying out functionality as described in this disclosure (e.g., the methods 200, 300, and 400).

The memory 503 may include various components (e.g., non-transitory, tangible computer-readable storage media) including, but not limited to, a random access memory component (e.g., RAM 504) (e.g., a static RAM "SRAM", a dynamic RAM "DRAM, etc.), a read-only component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable non-transitory, tangible computer-readable storage media described below. In some instances, ROM 505 and RAM 504 include non-transitory, tangible computer-readable storage media for carrying out the methods 200, 300, and 400. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable non-transitory, tangible computer-readable media described herein. Storage 508 may be used to store operating system 509, EXECs 510 (executables), data 511, API applications 512 (application applications), and the like. For instance, the storage 508 could be implemented for storage of data written to the storage 508 by an I/O interface controller device such as 122 in FIG. 1. Often, although not always, storage 508 is a secondary storage medium (such as a hard disk) that is slower than primary storage (e.g., memory 503). Storage 508 can also include an optical disk drive, a solid-state memory device (e.g., flash-based systems or non-volatile storage devices), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide nonvolatile and/or volatile storage of machine-readable instructions, data structures, application modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, such as mobile devices and enterprise systems, connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 530, may employ a wired and/or a wireless mode of communication. In general, any network topology may be used.

Information and data can be displayed through a display 532. Examples of a display 532 include, but are not limited to, a liquid crystal display (LCD), an organic liquid crystal display (OLED), a cathode ray tube (CRT), a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521.

In addition to a display 532, computer system 500 may include one or more other peripheral output devices 534 including, but not limited to, an audio speaker, a printer, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field applicationmable gate array (FPGA) or other applicationmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the methods 200, 300, and 400) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once applicationmed with the software module.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A non-volatile storage system for scaling an I/O interface frequency between a I/O interface controller device and a non-volatile storage device, the system comprising:
   a non-volatile storage device;
   a processor having one or more applications running thereon, each of the one or more applications configured to make read and write requests to the non-volatile storage device;
   an I/O interface to the non-volatile storage device;
   a clock control block for the I/O interface generating a clock signal;
   an I/O interface controller device that sends read/write requests to the non-volatile storage device over the I/O interface at a clock frequency corresponding to the clock signal;
   an I/O scheduler that:
      runs on the processor;
      schedules the read and write requests to an I/O queue of a storage driver, the storage driver configured to dispatch read/write requests from the I/O scheduler to the I/O interface controller;
      characterizes a predicted load on the I/O interface based on analysis of the read/write requests in the I/O queue as well as on an existing clock frequency of the I/O interface; and
   a frequency governor running on the processor that:
      performs a comparison of the predicted load to one or more thresholds; and
      commands the clock control block to decrease the clock signal whenever the predicted load indicates that decreasing the clock signal will not noticeably degrade a user experience.

2. The non-volatile storage system of claim 1, wherein each of the one or more applications is assigned a first, second, or third priority, and the frequency governor:
   increases the clock frequency when an application making one of the read/write requests is assigned the first priority;
   decreases the clock frequency when an application making one of the read/write requests is assigned the third priority; and
   increases, decreases, or maintains the clock frequency when an application making one of the read/write requests is assigned the second priority.

3. The non-volatile storage system of claim 2, wherein an application that blocks the I/O interface from additional read/write requests is assigned the first priority.

4. The non-volatile storage system of claim 3, wherein when no read/write requests in the I/O queue have completion deadlines, then the I/O scheduler assigns applications making the read/write requests the third priority state.

5. The non-volatile storage system of claim 4, wherein when no applications block the I/O interface, and at least one read/write request in the I/O queue has a deadline for completion, then the I/O scheduler assigns applications making the requests the second priority state.

6. The non-volatile storage system of claim 5, wherein given the second priority state, the frequency governor is more likely to:
  increase the clock frequency where a majority of the read/write requests in the I/O queue are non-periodic; and
  decrease the clock frequency where a majority of the read/write requests in the I/O queue are periodic.

7. The non-volatile storage system of claim 1, wherein the predicted load is a function of $\Sigma_{i=0}^{n_r} S_i$ where $n_r$ is the number of read/write requests in the I/O queue, and Si is the size of each read/write request.

8. The non-volatile storage system of claim 7, wherein Si, is the size of each read/write request in the I/O queue multiplied by a weight factor where greater weight is assigned to read/write requests having a more urgent need to be dispatched to the I/O interface.

9. The non-volatile storage system of claim 1, wherein the predicted load is a function of I/O interface throttling such that as a number of read/write requests dispatched to the I/O interface controller approaches a throttling threshold, the more likely that an increase in clock frequency will occur.

10. The non-volatile storage system of claim 1, wherein the predicted load is a function of access latency for the non-volatile storage device.

11. The non-volatile storage system of claim 10, wherein the access latency comprises a read/write access time and a bus access time, or a write access time and the bus access time.

12. The non-volatile storage system of claim 1, wherein the predicted load is a function of a likelihood of I/O preemption events.

13. The non-volatile storage system of claim 1, wherein the predicted load is a function of I/O access time allocated to each application to perform its queued read/write requests.

14. The non-volatile storage system of claim 1, wherein the predicted load is a function of missed read/write request deadlines.

15. The non-volatile storage system stem of claim 14, wherein the predicted load is a function of deadline periods allocated to each read/write request, wherein when a read/write request exceeds its deadline, the read/write request is pushed to a front of the I/O queue and dispatched to the I/O interface with a highest priority.

16. The non-volatile storage system of claim 1, wherein the I/O scheduler is a LINUX CFQ I/O scheduler.

17. A non-transitory, tangible computer readable storage medium, encoded with processor readable instructions to perform a method for conserving power in an I/O interface for a non-volatile storage device using adaptive frequency scaling, the method comprising:
  calculating a predicted load on the I/O interface based on analysis of queued read/write requests waiting for dispatch to an I/O interface controller device, the I/O interface coupled between an I/O interface controller device and a non-volatile storage device; and
  scaling a clock frequency of the I/O interface controller device based on the predicted load as follows:
    setting the clock frequency to a first clock frequency if the predicted load is greater than a first threshold;
    setting the clock frequency to a third clock frequency if the predicted load is less than a second threshold; and
    setting the clock frequency to a second clock frequency if the predicted load is between the first and second thresholds,
  the first clock frequency is greater than the second clock frequency and the second clock frequency is greater than the third clock frequency.

18. The non-transitory, tangible computer readable storage medium of claim 17, wherein setting the clock frequency to the first clock frequency includes increasing the clock frequency to the first clock frequency or leaving the clock frequency unchanged.

19. The non-transitory, tangible computer readable storage medium of claim 17, wherein setting the clock frequency to the second clock frequency includes scaling the clock frequency to the second clock frequency or leaving the clock frequency unchanged.

20. The non-transitory, tangible computer readable storage medium of claim 17, wherein setting the clock frequency to the third clock frequency includes decreasing the clock frequency to the third clock frequency or leaving the clock frequency unchanged.

21. The non-transitory, tangible computer readable storage medium of claim 17, further comprising increasing the clock frequency when a number of read/write requests in the I/O queue is predicted to miss predefined execution deadlines exceeds a first threshold.

22. The non-transitory, tangible computer readable storage medium of claim 17, further comprising increasing the clock frequency when a number of read/write requests in the I/O queue exceeds a first threshold.

23. A method for conserving power in an I/O interface for a non-volatile storage device using adaptive frequency scaling, the method comprising:
  calculating a predicted load on the I/O interface based on analysis of queued read/write requests waiting for dispatch to an I/O interface controller device, the I/O interface coupled between an I/O interface controller device and a non-volatile storage device; and
  scaling a clock frequency of the I/O interface controller device based on the predicted load as follows:
  setting the clock frequency to a first clock frequency if the predicted load is greater than a first threshold;
  setting the clock frequency to a third clock frequency if the predicted load is less than a second threshold; and
  setting the clock frequency to a second clock frequency if the predicted load is between the first and second thresholds,
  the first clock frequency is greater than the second clock frequency and the second clock frequency is greater than the third clock frequency.

24. The method of claim 23 wherein setting the clock frequency to the first clock frequency includes increasing the clock frequency to the first clock frequency or leaving the clock frequency unchanged.

25. The method of claim 23 wherein setting the clock frequency to the second clock frequency includes scaling the clock frequency to the second clock frequency or leaving the clock frequency unchanged.

26. The method of claim 23 wherein setting the clock frequency to the third clock frequency includes decreasing the clock frequency to the third clock frequency or leaving the clock frequency unchanged.

27. The method of claim 23 further comprising increasing the clock frequency when a number of read/write requests in the I/O queue is predicted to miss predefined execution deadlines exceeds a first threshold.

28. A system comprising:
a non-volatile storage device;
an I/O interface to the non-volatile storage device;
means for calculating a predicted load on the I/O interface based on analysis of queued read/write requests waiting for dispatch to an I/O interface controller device, the I/O interface coupled between an I/O interface controller device and a non-volatile storage device; and
means for scaling a clock frequency of the I/O interface controller device based on the predicted load as follows:
means for setting the clock frequency to a first clock frequency if the predicted load is greater than a first threshold;
means for setting the clock frequency to a third clock frequency if the predicted load is less than a second threshold; and
means for setting the clock frequency to a second clock frequency if the predicted load is between the first and second thresholds,
the first clock frequency is greater than the second clock frequency and the second clock frequency is greater than the third clock frequency.

* * * * *